C. T. McCUE.
PERCH ATTACHMENT FOR VEHICLES.
APPLICATION FILED MAR. 25, 1908.

1,029,879.

Patented June 18, 1912.

WITNESSES:

INVENTOR.
Charles T. McCue,
BY
ATTORNEY.

UNITED STATES PATENT OFFICE.

CHARLES T. McCUE, OF HARTFORD, CONNECTICUT, ASSIGNOR TO FRANK E. WILCOX AND LESTER E. HICKOK, BOTH OF MECHANICSBURG, PENNSYLVANIA.

PERCH ATTACHMENT FOR VEHICLES.

1,029,879.  Specification of Letters Patent.  Patented June 18, 1912.

Application filed March 25, 1908. Serial No. 423,135.

*To all whom it may concern:*

Be it known that I, CHARLES T. McCUE, a citizen of the United States, and a resident of Hartford, in the county of Hartford and State of Connecticut, have invented a new and Improved Perch Attachment for Vehicles, of which the following is a specification.

My invention relates to the class of devices described, and the object of the invention among others, is the production of such a device having numerous novel features of advantage and utility.

A form of device in the use of which these objects may be attained is illustrated in the accompanying drawings, in which—

Figure 1:
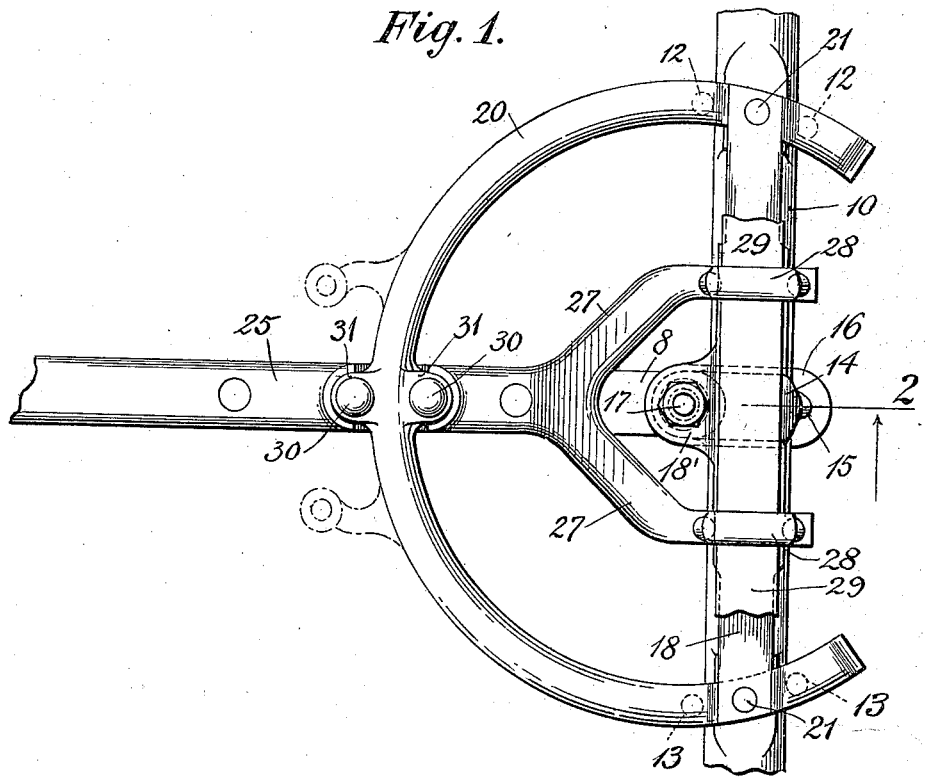
Figure 2:
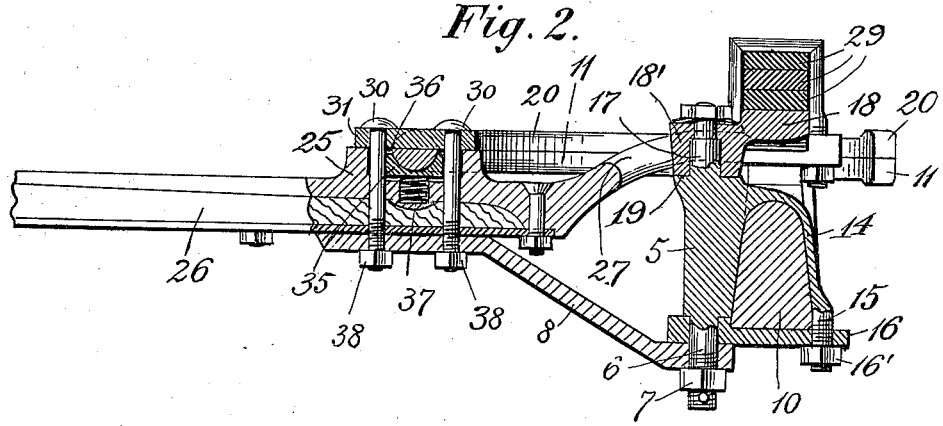

Figure 1 is a top plan view of a portion of the running gear of a vehicle, showing an embodiment of my invention. Fig. 2 is a view in side elevation, partially in section, on plane denoted by line 2—2 of Fig. 1.

In the drawings 10 denotes the axle of the vehicle, which carries a ring segment 11 constituting the movable and lower one of a pair of coacting members which together form the so-called "fifth wheel" of the carriage, said ring 11 being preferably provided with shackle-bolts 12, 13, adapted to straddle the axle 10 and secured in place thereon in any suitable manner.

A king bolt body or base 5 is supported upon the axle, preferably about midway of its length, this body being formed of any suitable material, as iron, of suitable form and dimensions to provide the requisite strength. This body is located at the back of the axle, and a clip 14 projects from one side thereof, in the form shown, near the top over the axle and down upon the opposite side thereof. The end of this clip is formed into a bolt 15 for the reception of a nut 16' in the usual manner of clips used in carriage construction.

A bolt 6 extends from the base 5, a yoke 16 passing underneath the axle and being secured upon the bolts 6 and 15 by means of the nuts 16' and 7. A king bolt 17 formed as an integral part of the base 5 extends upward therefrom through a socket 18' in a head block plate 18 to rotate therein. The body 5 at the base of the king bolt is formed into a seat 19 for a head-block-plate 18 carrying a ring segment 11, which plate may be connected with the pole or shafts of the carriage in the usual manner, not shown.

The king bolt is preferably shouldered, as shown in Fig. 2 of the drawings, the larger part being located in the enlarged part of the socket in the head block plate. The king bolt 17 is thus formed as an integral part of the body or base 5 which is rigidly secured to the axle, the king bolt being located in axial alinement with the bolt 6. A very rigid and firm attachment for the king bolt is thus obtained, and a structure provided which is peculiarly free from rattling.

A brace 8 mounted at one end on the bolt 6 and secured to the perch at the opposite end is employed for giving rigidity and strength to the structure. This brace may have a resiliency tending to spring inward toward the socket 18', thus producing a clamp between the members of which the body 5 is resiliently held, thus preventing all liability to loosening of parts and therefore rattling.

The ring member 11 is in sliding engagement with the upper and stationary annulus 20 concentrically disposed relatively to the ring 11 and king bolt 17, said annulus 20 and head block plate 18 above referred to, being secured together by bolts or rivets 21. From the foregoing it will be understood that any swinging movement of the axle 10 around the king bolt 17 will result in moving the lower ring 11 relatively to the upper member 20, both of these members being held in sliding contact with each other and at the same time in a substantially horizontal plane, by a perch plate which, in the form herein shown, has a stem 25 which is rigidly secured to the vehicle reach 26 and has its forward end bifurcated to form a pair of arms 27 which are adapted to receive clips 28 whereby the front vehicle spring-leaves 29, branches 27, and plate 18 may be rigidly secured together, therefore preventing any movement of the annulus 20 relative to the reach 26. In order to strengthen this combination the upper annulus may be further secured to the reach arm 26 as for instance by bolts 30 passing through ears 31 of the annulus 20 and also through apertures provided therefor in the reach arm 26, care being taken, however, to permit the lower ring 11 to move freely and in contact with the upper annulus at this point, and in order to prevent the two rings from rattling as the vehicle travels over the road, I provide a shoe 35 which is vertically movable in a recess 36 established between the bolts 30, and is preferably acted upon to force the lower ring 11 against the upper annulus 20 as for instance by a spring 37 seated within a recess in the perch plate 25, as is clearly shown in Fig. 2.

The construction herein illustrated and described provides an extremely rigid and strong connection between the front and rear axles of a light road vehicle. The construction of the branching arms enables the perch to be very rigidly secured, especially against lateral movement, and such connection and the fastening of the fifth wheel to the top thereof provides a construction in which the perch and fifth wheel support brace each other, and the offsetting of the arms upward enables the parts to be so connected and secured as to enhance the result as to rigidity.

It will be noted that the arms 27 are curved upward within the circle formed by the fifth wheel, and the connection of the brace 8 with the socket 18', through the arms 27 and head block plate and also through said plate with the outer ends of the upper circle presses the ends of the circle in engagement and tends to retain them in this position.

I claim—

1. An axle, a body part having an integral strap embracing the axle, said body part being located in the rear of the axle, bolts integrally formed on opposite ends of the body part, and a running gear including a perch plate connected with the bolts at the top and bottom of said body part.

2. An axle, a fifth wheel supported thereon and with ears projecting laterally of the circle of the fifth wheel, a perch plate including a stem passing across the fifth wheel and secured to said ears, said stem branching into arms, a head block plate passing across said arms, means for securing the head block plate to the axle, and means for securing the head block plate and arms together.

3. An axle, a fifth wheel supported thereon, a perch passing across the fifth wheel, a head-block plate separately formed from the fifth wheel and having a socket intermediate its ends, clips having their ends passing through said arms and securing the head-block plate thereto, a body-part having an integral strap embracing the axle, said body-part being located in the rear of the axle, bolts integrally formed on opposite ends of said body-part, one of said bolts engaging said socket, and a brace extending from the perch and secured to the other bolt.

4. An axle, a fifth wheel supported thereon, a perch passing across the fifth wheel and having branching arms, a head-block plate separately formed from the fifth wheel and having a socket intermediate its ends, a clip passing through said arms and securing the head-block plate and arms together, a body-part having a clip integrally formed and extending to embrace an axle, said body-part being located in the rear of the axle, bolts integrally formed with the body-part and projecting from opposite ends, one of said bolts engaging said socket, a yoke uniting said clip and bolt at the lower end of the body-part, and a brace extending from the perch and in engagement with said bolt at the bottom of the body-part.

CHARLES T. McCUE.

Witnesses:
M. H. ALLEN,
J. H. RHODES.

---

Copies of this patent may be obtained for five cents each, by addressing the "Commissioner of Patents, Washington, D. C."